(No Model.)
J. C. BALLEW.
APPARATUS FOR REMOVING GUM FROM SAWS.
No. 358,323. Patented Feb. 22, 1887.
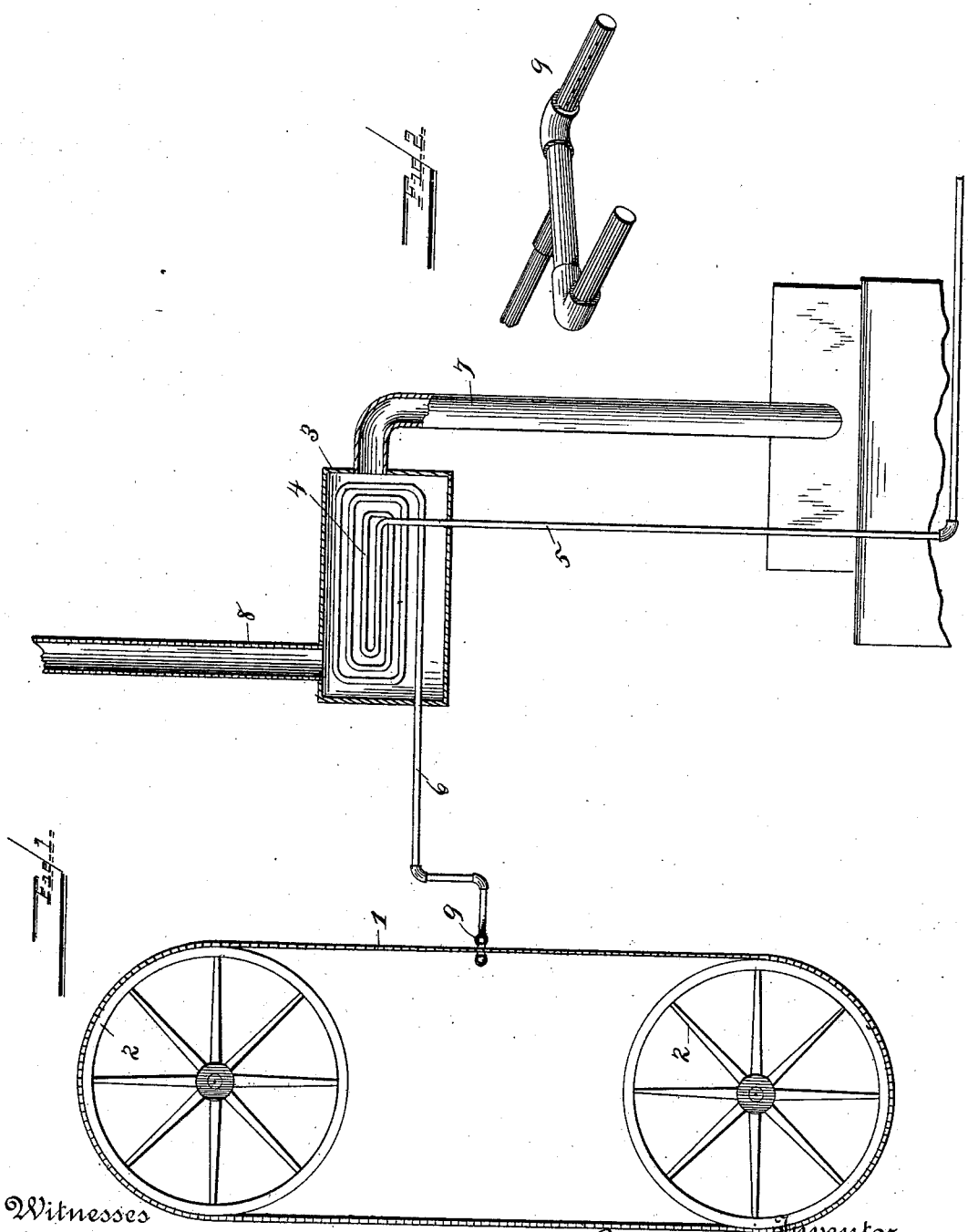

UNITED STATES PATENT OFFICE.

JOHN C. BALLEW, OF EVANSVILLE, INDIANA.

APPARATUS FOR REMOVING GUM FROM SAWS.

SPECIFICATION forming part of Letters Patent No. 358,323, dated February 22, 1887.

Application filed October 25, 1886. Serial No. 217,195. (No model.)

*To all whom it may concern:*

Be it known that I, JOHN C. BALLEW, of Evansville, in the county of Vanderburg and State of Indiana, have invented certain new and useful Improvements in Heating Apparatus for Removing the Gum from Saws; and I do hereby declare that the following is a full, clear, and exact description of the invention, which will enable others skilled in the art to which it appertains to make and use the same, reference being had to the accompanying drawings, which form a part of this specification, and in which—

Figure 1 is a view, partly in section, showing my improved device for removing the gum from band-saws; and Fig. 2 is a view on an enlarged scale of the nozzle or mouth-piece.

Similar numerals of reference indicate corresponding parts in both the figures.

My invention has relation to that class of apparatus for removing gum from band-saws in which a heated jet is forced against both sides of the saw as it leaves the work, cleaning and dissolving the gum from the saw; and it consists in the improved construction and combination of parts of an apparatus in which water is heated and forced against the saw-blade, removing the gum, as hereinafter more fully described and claimed.

Devices have heretofore been used for removing gum from band-saws in which a jet of steam was forced against each side of the blade, dissolving the gum and removing it; but by blowing the heated steam against the saw the heat of the steam is liable to take the temper out of the saw and thus to cause it to break, and the steam escaping from the nozzle or mouth-piece will, besides, fill the room in which it is used, causing the metallic parts of the machinery to rust and the leather in the belting to rot, causing considerable injury and damage, which is not compensated for by the removal of the gum from the saw; and for the purpose of removing the gum from the saw without causing any injury or damage to any of the surroundings of the saw I have constructed a device by means of which a jet of hot water is forced against the sides of the saw-blade, and a device for heating the same, so that the hot water may remove the gum without forming sufficient steam to injure the surroundings and without being sufficiently hot to injure the temper of the saw, as I shall now proceed to describe.

In the accompanying drawings, the numeral 1 indicates the saw-blade, which passes over the pulleys 2, and is of the usual construction.

A casing, 3, has a coil, 4, connected to a water-supply pipe, 5, at one end and a discharge-pipe, 6, at the other end, and this casing has a pipe, 7, entering it at one side, conveying the exhaust-steam from the engine driving the sawing machinery of the place, while it is provided with an exhaust-pipe, 8, at the other side, through which the exhaust-steam from the engine may pass out again from the casing.

The discharge-pipe extending from the coil is provided with two nozzles or mouth-pieces, 9, by means of which two jets of water may be brought to bear against the sides of the band-saw, the said nozzles straddling the blade, and it will be seen that when the water passes from the supply-pipe through the coil in the casing it will be heated by the exhaust-steam passing through the said casing and around the coil, and will receive sufficient heat to dissolve the gum upon the saw.

If desired, the heater for the water may be of a different construction and the water may be taken directly from the boiler, although I prefer to use the herein-described device, as the water will receive a sufficient temperature to dissolve the gum without causing the saw to lose it temper, and the exhaust-steam of the engine will be utilized without obstructing its free outward passage in any manner.

The water may be drawn from any desirable source, all that is required being a sufficient head for forcing it through the nozzles, and the said nozzles or mouth-pieces may be of any suitable construction and may be placed at any desired point of the saw-blade, being, however, preferably placed at the guide for the work to be sawed, above the same, the device being preferably used with saws for sawing hoop-poles, where the nozzles are preferably placed immediately above the guides for the poles.

Having thus described my invention, I claim and desire to secure by Letters Patent of the United States—

In a device for cleaning gum from band-saws, the combination of a casing having the exhaust-pipe of an engine opening into one side and having an outlet-pipe at the other side, a coiled pipe having an inlet-pipe and a discharge-pipe at its ends and inclosed in the casing, and a nozzle or mouth-piece at the end of the discharge-pipe straddling the saw-blade and emitting jets of heated water against both sides of the blade, as and for the purpose shown and set forth.

In testimony that I claim the foregoing as my own I have hereunto affixed my signature in presence of two witnesses.

JOHN C. BALLEW.

Witnesses:
CURRAN A. DeBRULER,
MICHAEL PFISTNER.